(12) United States Patent
Spero et al.

(10) Patent No.: US 9,616,924 B2
(45) Date of Patent: Apr. 11, 2017

(54) AUTONOMOUS LANE CONTROL SYSTEM

(71) Applicant: FORD GLOBAL TECHNOLOGIES, LLC, Dearborn, MI (US)

(72) Inventors: Dorian Jack Spero, Reading, MA (US); Thomas Edward Pilutti, Ann Arbor, MI (US); Matthew Y. Rupp, Canton, MI (US); Peter Gyumyeong Joh, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/886,612

(22) Filed: Oct. 19, 2015

(65) Prior Publication Data
US 2016/0039458 A1 Feb. 11, 2016

Related U.S. Application Data

(62) Division of application No. 13/351,297, filed on Jan. 17, 2012, now Pat. No. 9,187,117.

(51) Int. Cl.
*B62D 6/00* (2006.01)
*B62D 15/02* (2006.01)
(Continued)

(52) U.S. Cl.
CPC ............ *B62D 15/025* (2013.01); *B60K 35/00* (2013.01); *B60W 10/18* (2013.01); *B60W 10/20* (2013.01);
(Continued)

(58) Field of Classification Search
CPC ..... B60K 31/04; G06F 165/00; B62D 15/025; G06K 9/00805; G06K 9/00798;
(Continued)

(56) References Cited

U.S. PATENT DOCUMENTS

| 5,521,579 A | 5/1996 | Bernhard |
| 6,853,884 B2 | 2/2005 | Sadano |

(Continued)

FOREIGN PATENT DOCUMENTS

| CN | 101132965 A | 2/2008 |
| CN | 101574970 A | 11/2009 |

(Continued)

OTHER PUBLICATIONS

Naranjo, Jose E., et al., Lane-Change Fuzzy Control in autonomous Vehicles for the Overtaking Maneuver, IEEE Transactions on Intelligent Transportation Systems, vol. 9, No. 3, Sep. 2008, pp. 438-450.

(Continued)

*Primary Examiner* — Dalena Tran
(74) *Attorney, Agent, or Firm* — Frank A. MacKenzie; Brooks Kushman P.C.

(57) ABSTRACT

An autonomous control system for a vehicle that controls the speed and steering system of the vehicle to operate in a lane-keeping mode or a lane-changing mode. Position sensors sense the location of surrounding vehicles. A lane determining system identifies a current lane where the vehicle is located. A source of oncoming lane course data provides information as to the course of the current lane. A controller provides instructions to the steering system and speed control system to maneuver the vehicle in either the lane-keeping mode or the lane-changing mode. The driver may override the control system by providing a manual input to the steering system or the speed control system.

18 Claims, 5 Drawing Sheets

(51) Int. Cl.
*B62D 1/28* (2006.01)
*B60W 50/08* (2012.01)
*B60W 30/12* (2006.01)
*B60W 30/14* (2006.01)
*B60W 30/18* (2012.01)
*B60W 10/18* (2012.01)
*B60W 10/20* (2006.01)
*G05D 1/00* (2006.01)
*B60K 35/00* (2006.01)
*G01C 21/36* (2006.01)

(52) U.S. Cl.
CPC .......... *B60W 30/12* (2013.01); *B60W 30/143* (2013.01); *B60W 30/18163* (2013.01); *B60W 50/082* (2013.01); *B62D 1/28* (2013.01); *B62D 1/286* (2013.01); *B62D 15/0255* (2013.01); *G01C 21/3667* (2013.01); *G05D 1/0088* (2013.01); *B60W 2550/30* (2013.01); *B60W 2550/308* (2013.01)

(58) Field of Classification Search
CPC ...... B60W 10/18; B60W 10/20; B60W 30/12; B60W 2550/306; B60W 2550/308; B60W 30/18163; B60W 30/162; B60W 30/16; B60T 2201/08; B60T 2201/081; B60T 2201/087; B60T 8/17557; G05D 1/0088; G05D 1/0212; G05D 1/0289
USPC .... 701/26, 93, 96, 300, 301, 41, 23, 70, 79; 342/455, 458; 340/903, 435, 436
See application file for complete search history.

(56) References Cited

U.S. PATENT DOCUMENTS

| | | | |
|---|---|---|---|
| 6,873,911 B2 | 3/2005 | Nishira et al. | |
| 6,985,805 B2 | 1/2006 | Sudou et al. | |
| 8,165,776 B2* | 4/2012 | Sugawara | B60W 30/12 340/436 |
| 8,219,298 B2* | 7/2012 | Nishira | B60K 31/0008 701/1 |
| 8,385,600 B2 | 2/2013 | Nara et al. | |
| 8,751,134 B2* | 6/2014 | Dorenkamp | B60W 30/16 701/300 |
| 2002/0095246 A1 | 7/2002 | Kawazoe | |
| 2004/0193374 A1 | 9/2004 | Hac et al. | |
| 2008/0091318 A1 | 4/2008 | Deng et al. | |
| 2009/0319113 A1 | 12/2009 | Lee | |
| 2010/0082195 A1 | 4/2010 | Lee et al. | |
| 2010/0228420 A1 | 9/2010 | Lee | |
| 2011/0190972 A1 | 8/2011 | Timmons et al. | |
| 2012/0314070 A1 | 12/2012 | Zhang et al. | |
| 2013/0060414 A1 | 3/2013 | Lee et al. | |

FOREIGN PATENT DOCUMENTS

| | | |
|---|---|---|
| CN | 101837781 A | 9/2010 |
| EP | 1726513 A1 | 11/2006 |
| JP | 2005141484 A | 6/2005 |

OTHER PUBLICATIONS

GB Search Report for Application No. GB 1223279.9 dated Jun. 6, 2013.

* cited by examiner

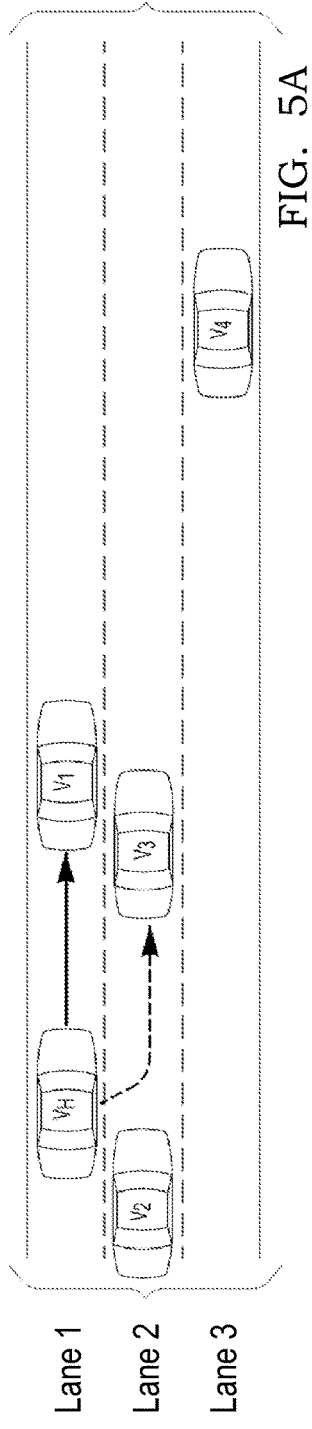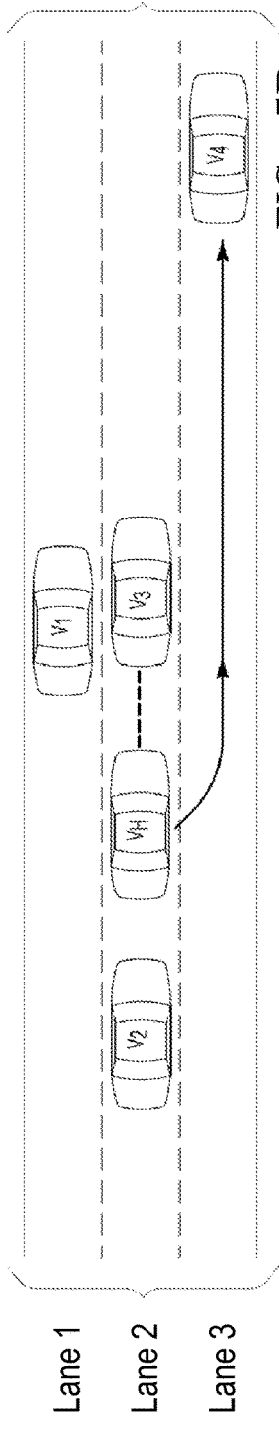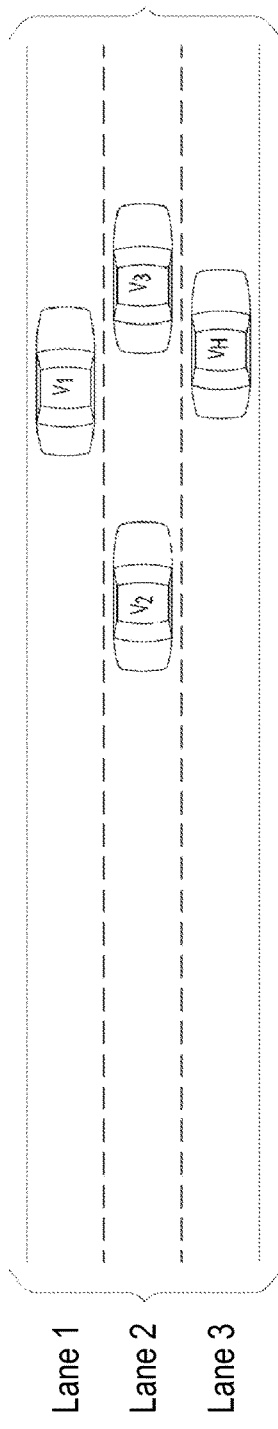

AUTONOMOUS LANE CONTROL SYSTEM

CROSS-REFERENCE TO RELATED APPLICATIONS

This application is a division of U.S. application Ser. No. 13/351,297, filed Jan. 17, 2012, now U.S. Pat. No. 9,187,117, issued on Nov. 17, 2015, the disclosure of which is hereby incorporated in its entirety by reference herein.

TECHNICAL FIELD

The present application relates to a system that assists a driver of a vehicle to either change lanes while driving or maintain the vehicle in the same lane.

BACKGROUND

The driver of a vehicle generally controls the course and speed of the vehicle by steering, accelerating and braking the vehicle. Cruise control systems are available that allow a driver to set a desired speed for the vehicle to travel. Normally, if the driver touches the brake pedal, the cruise control system is overridden and control of the vehicle speed is returned to the driver. If a driver depresses the accelerator pedal, the vehicle may remain in cruise control while the vehicle speed is increased while the accelerator remains depressed. After braking, the cruise control system may allow the vehicle to resume a previously set speed. Adaptive cruise control systems have sensors that sense the speed of a vehicle in front of the vehicle that is being operated and adjust the speed setting to assure a sufficient following distance.

Systems are available that assist a driver of a vehicle to parallel park. Parallel parking systems may be activated by positioning the vehicle in a prescribed position relative to an available parking space. Once positioned, the parallel parking system assumes control of the operation of the vehicle until the vehicle is parked in the desired parking space. Parallel parking systems are intended to park a vehicle relative to stationary vehicles that are in a single curb lane and spaced apart a fixed distance.

Autonomous control of vehicles for normal driving on roads is not available in vehicles. A fully autonomous vehicle control system would transfer control of vehicle steering, acceleration and braking to the vehicle control system. Several factors make such systems unacceptable including the difficulty of anticipating upcoming roadway curvature, lane availability, merging lane locations, and the speed and location of surrounding vehicles. In addition, limitations on the ability to sense and quickly process data relating to lane location and the location of surrounding vehicles preclude truly fully autonomous control of vehicles on normal roadways. Roadways are dynamic systems that are constantly changing and it is difficult to program a vehicle for fully autonomous control.

SUMMARY

An autonomous lane control system is disclosed that allows the vehicle to automatically control the speed and course of the vehicle to remain in a selected lane or change lanes. The lane control system allows the driver to select either a lane changing mode or a lane keeping mode. The vehicle controls changing lanes without human intervention when the lane changing mode is selected. The vehicle controls steering and vehicle speed to remain in the same lane, to the extent practicable, in the lane keeping mode. In either the lane changing mode or the lane keeping mode, the driver may over-ride the autonomous lane control system by applying the brake or resuming control of the steering wheel.

BRIEF DESCRIPTION OF THE DRAWINGS

FIGS. 5A-5C are a series of schematic diagrams of a multi-vehicle, multi-lane driving condition showing a path generated by the controller;

DETAILED DESCRIPTION

Figure 1:
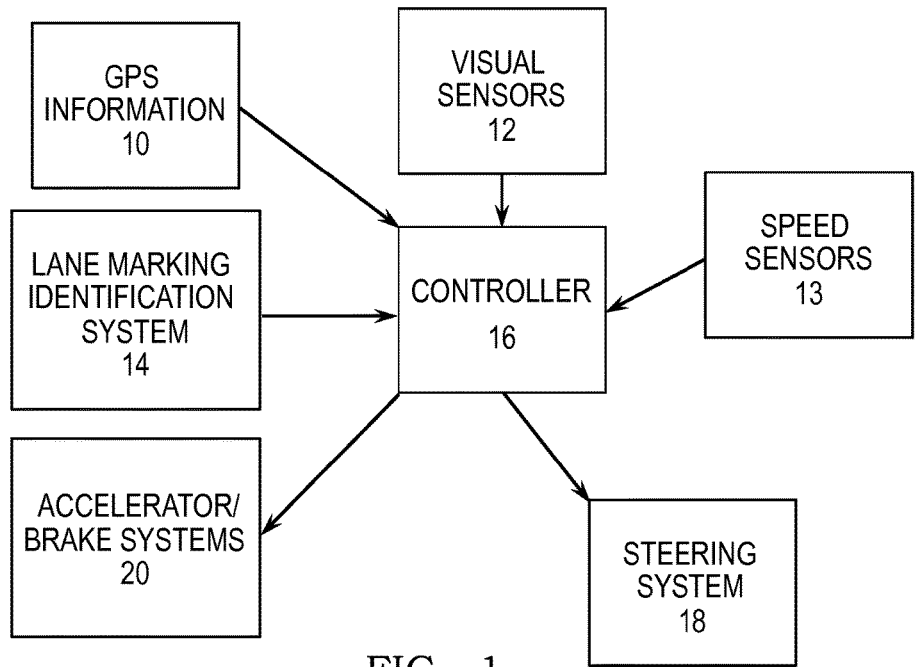
FIG. 1 is a schematic block diagram of the steering control.

Detailed embodiments are disclosed that may be embodied in various and alternative forms. The figures are not necessarily to scale and some features may be exaggerated or minimized to show details of particular components. The specific structural and functional details disclosed are not to be interpreted as limiting, but merely as a representative basis for teaching one skilled in the art to make and use the disclosed embodiments.

These three sensory inputs (GPS, visual sensors and lane-marking sensors) provide continuous information to a controller 16. These three sensory inputs in some form or combination make up the location sensors. Based on the information received, the controller 16 establishes the current lane where the vehicle is located and calculates the precise angle the steering system 18 needs to be adjusted in order to steer the vehicle to path calculated earlier. While steering the vehicle into this path, the GPS system 10 and visual sensors 12 continue to send real-time information to the controller 16. The controller 16 re-calculates the path to reflect the changes in the position of other vehicles or other roadway conditions, if necessary. The controller 16 receives information regarding the map data from the GPS system 10, calculates an appropriate path, and provides the information to the accelerator and brake systems 20. The controller 16 verifies that the speed of vehicle is the appropriate speed to travel in the pre-calculated path (with the existing gap between vehicles). The updated visual or map data may be used to recalculate the speed or lane changing path and allows the controller 16 to change the speed and the path to adapt to changing conditions.

These three sensory inputs (GPS, visual sensors and lane-marking sensors) provide continuous information to a controller 16. These three sensory inputs in some form or combination make up the location sensors. Based on the information received, the controller 16 establishes the current lane where the vehicle is located and calculates the precise angle the steering system 18 needs to be adjusted in order to steer the vehicle to path calculated earlier. While steering the vehicle into this path, the GPS system 10 and visual sensors 12 continue to send real-time information to the controller 16. The controller 16 re-calculates the path to reflect the changes in the position of other vehicles or other roadway conditions, if necessary. The controller 16 receives information regarding the map data from the GPS system 10 calculates an appropriate path and provides the information to the accelerator and brake systems 20. The controller 16 verifies that the speed of vehicle is the appropriate speed to travel in the pre-calculated path (with the existing gap between vehicles). The updated visual or map data may be used to recalculate the speed or lane changing path and allows the controller 16 to change the speed and the path to adapt to changing conditions.

Figure 2A:
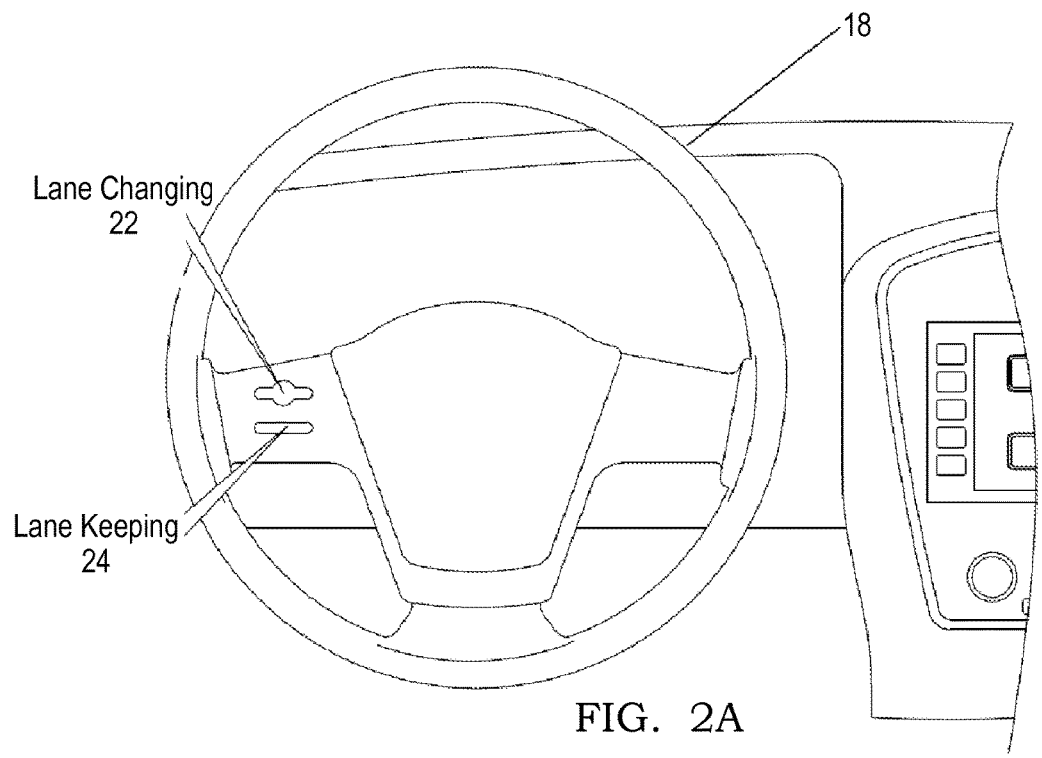
FIG. 2A is an elevation view of the steering wheel with lane control mode switches.
Figure 2B:
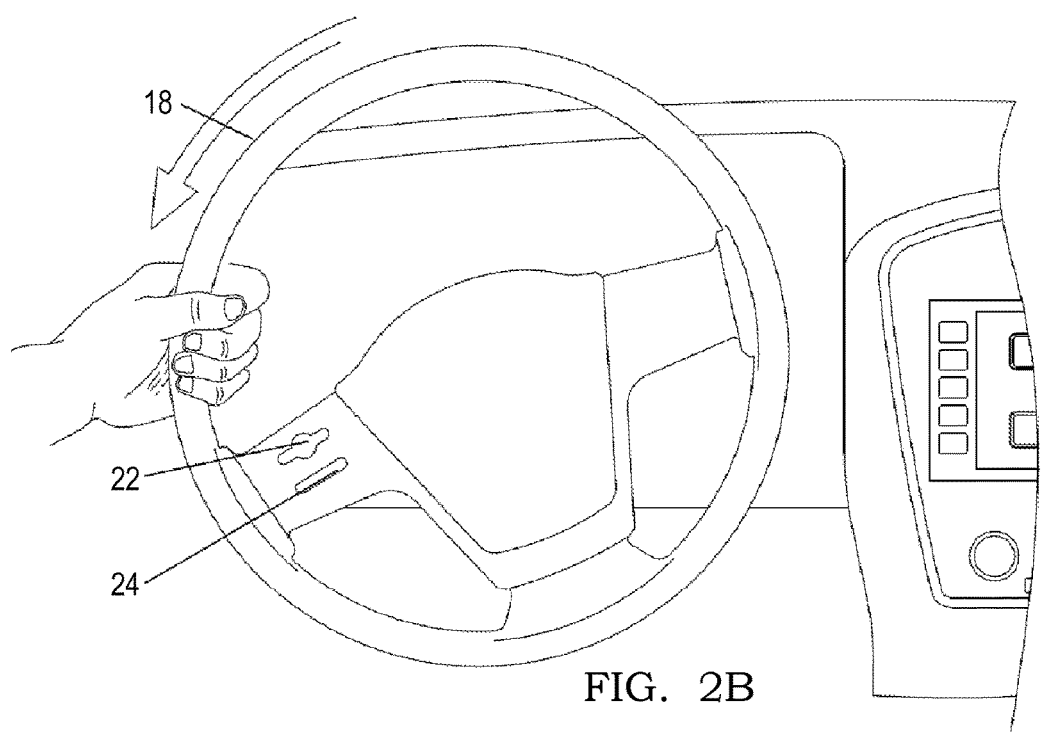
FIG. 2B is an elevation view showing a steering wheel being turned to override the autonomous control of the system to return control to the driver.

FIGS. 2A and 2B illustrate steering wheel controls for selecting the mode of operation of the vehicle. In FIG. 2A, there are two switches 22 and 24 respectively. Lane changing may be selected by activating switch 22 causing the controller 16 to change lanes for the vehicle. If lane keeping is selected 24, the controller 16 executes the lane keeping operation for the vehicle. In FIG. 2B, the steering wheel 18 is moved during the lane control execution. When the steering system 18 is moved (a manual input), control is transferred from the controller 16 to the user. The user can also resume control of the vehicle by depressing a brake switch associated with the accelerator and brake system 20 (as shown in FIG. 1).

Figure 3:
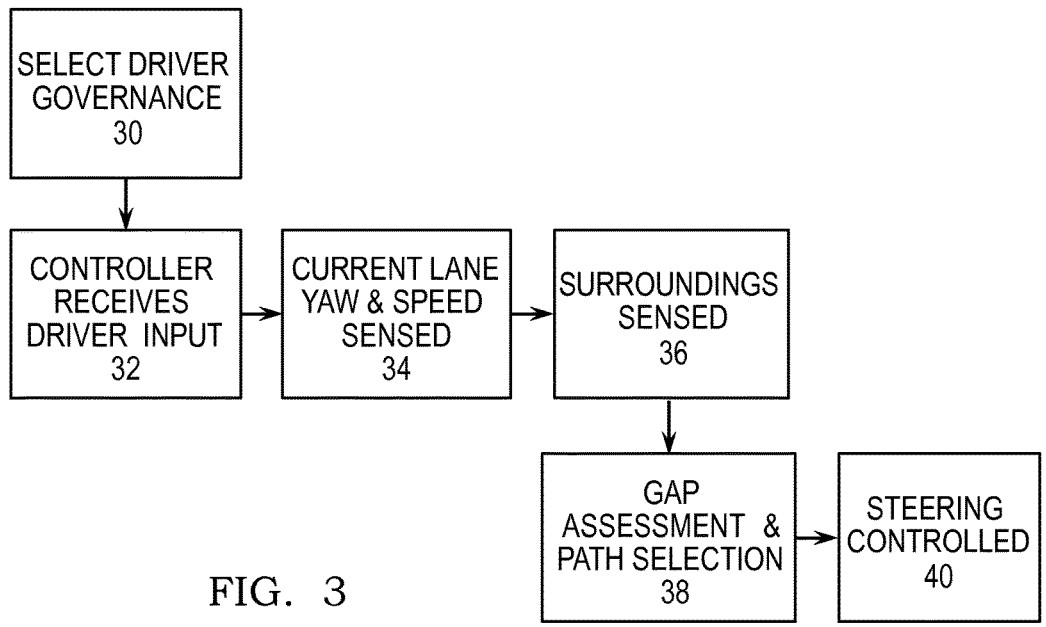
FIG. 3 is a block diagram of the autonomous lane control algorithm.

FIG. 3 is a block diagram of the autonomous lane control algorithm for a vehicle operated in a roadway environment. The vehicle is equipped with two switches (22 and 24) for selecting a driving governance mode in operation 30. (See FIGS. 2A-2B). The switches 22, 24 indicate to the vehicle controller 16 that the driver either has selected a lane changing optimization mode or a lane keeping optimization mode. The driver may also select a maximum speed for the vehicle. The driver selects the maximum speed by setting the cruise control to the desired speed. After setting the cruise control to the desired speed, the driver selects the lane changing mode. This signals to the controller 16 that the driver has selected the maximum speed for lane changing. If driver does not select a maximum speed, the algorithm may set a speed to allow the motor vehicle to keep pace with the traffic. The algorithm senses the speed of vehicles in the adjacent lane. Based on the speed of the vehicles in the adjacent lane, the algorithm sets the speed that is equivalent to the speed of the vehicles in the adjacent lane to allow for lane-changing.

In operation 32, the controller 16 receives inputs regarding the instantaneous position of surrounding vehicles repetitively to determine the speed and acceleration of surrounding vehicles. Using the information received from these inputs, the vehicle controller sends instructions to execute the autonomous mode control operation.

In operation 34, the current speed, yaw rate, size of other surrounding vehicles and the current lane assignment (the lane that the vehicle is travelling) is sent to the controller 16. The speed of the vehicle can be determined by a speedometer, while a vehicle's yaw rate is established using an accelerometer or other vehicle-condition-related input devices. The yaw rate is used to determine roadway banking and curvature. The size of surrounding vehicles is used to determine appropriate lane-changing distance.

The current lane assignment for the vehicle may be sensed in many ways. The lane marking sensors 14 can be created out of a software-based map system that may be used to provide information relating to the different types of lane marking (dashed yellow, dashed white or solid yellow) and the number of lanes on a roadway. Visual sensors 12 may be used to distinguish lane markings to determine the lane where the vehicle is being operated. The GPS 10 receiver may provide a reference for the vehicle to establish the current lane assignment of the vehicle.

In operation 36, the surrounding environment of a vehicle is determined. The environment includes a relative position of the vehicle in comparison with a plurality of surrounding vehicles. The relative position compared to other vehicles can be determined by sensing the position of the surrounding vehicles. Various sensor inputs may be used to sense the relative position of other vehicles on a roadway with respect to the vehicle. These sensor inputs may include radar, laser, infra-red (IR), image scanners and video cameras. A GPS receiver may be used to provide a reference point for the vehicle in comparison with the sensed position of surrounding vehicles. The vehicle controller receives visual and GPS inputs to determine the current location of the vehicle relative to the roadway. The input sensors are used to determine the relative position of surrounding vehicles. The relative speed and acceleration of surrounding vehicles is determined by frequently sampling the instantaneous location of all of the surrounding vehicles and calculating the change in location and the rate of change in relative location.

Referring to FIG. 3, in operation 38, the vehicle controller selects a path for the vehicle to travel depending on the operation mode that is selected by the driver. The vehicle controller also selects a speed for the vehicle to execute the maneuver. Path-selection is calculated based on continuous feedback relating to the constantly changing available gap information. The gap information is calculated based upon the speed and position of surrounding vehicles.

In operation 40, the vehicle controller 16 sends the information regarding the selected path to a steering system that controls vehicle steering. Referring to FIG. 1, a continuous feedback loop between the GPS 10 and sensors 12 are used by the controller 16 to maneuver the steering system 18. The GPS 10 and sensors 12 continuously update information about both the path and the speed of the surrounding vehicles in real-time. Based on this information, the controller 16 may also adjust the speed of the vehicle by sending signals to the braking and accelerator systems 20.

Figure 4:
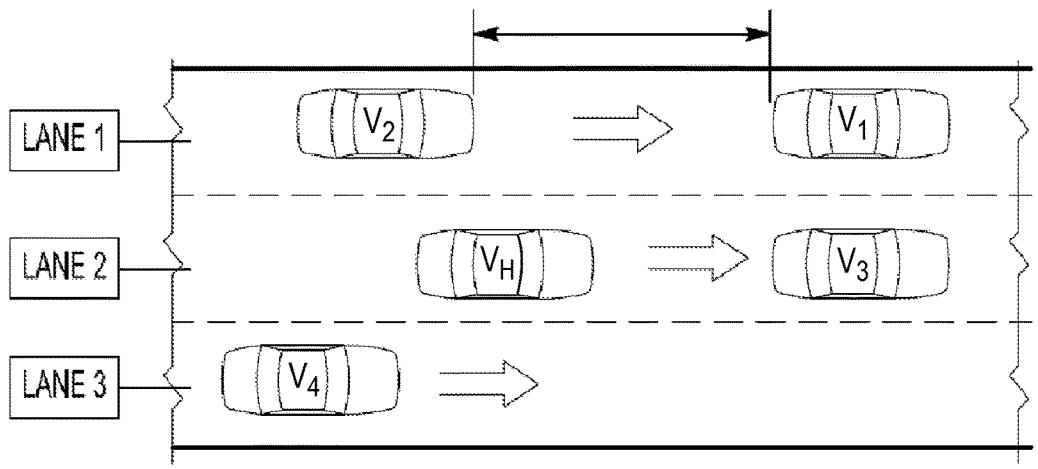
FIG. 4 is a schematic diagram of a multi-vehicle, multi-lane driving condition that illustrates how a gap assessment may be performed by the vehicle.

Referring to FIG. 4, the vehicle controller estimates a gap between the surrounding vehicles based on the position and the speed of the surrounding vehicles. A source vehicle $V_{UC}$ is the vehicle that is being operated autonomously. The source vehicle $V_H$ is travelling at a known speed in lane 2. The input location sensors on the source vehicle $V_H$ sample the position of the vehicle $V_2$ that the source vehicle $V_H$ is following. The speed of vehicle $V_3$ is assessed and the current speed of source vehicle $V_H$ is set to allow for the autonomous operation. If the source vehicle $V_H$ is in the lane-changing mode and a request is made to change lanes into Lane 1 and the speed of $V_3$ is such that it allows for lane changing, data from the input location sensors is processed by the controller for the source vehicle $V_H$ to estimate the gap between the two surrounding vehicles $V_2$ and $V_1$. If the gap is suitable to perform a lane change, the controller 16 calculates a path for the vehicle to travel. If the gap is not suitable, the controller 16 waits for one of the surrounding vehicles ($V_1$ or $V_2$) to change its position with respect to the source vehicle $V_H$. The controller 16 repeats the process until it ascertains if the new gap is suitable for executing a lane-changing maneuver.

FIG. 5A-5C illustrates an example of a particular path-generation maneuver performed by the controller.

FIG. 5A illustrates the vehicle in the present position. The source vehicle $V_H$ is the vehicle equipped with the controller 16 that uses an algorithm for performing the lane change. The source vehicle $V_H$ controller 16 sets an initial path based on the gap assessment. The initial path can be set using an adaptive routing algorithm which is known in the art. In this situation, the path is calculated using the adaptive routing algorithm, where smaller steps are calculated based on available data.

The controller 16 then calculates a path for the source vehicle. The path is calculated by sampling the position of the surrounding vehicles using small time-based intervals. The path can be estimated based on the speed of the surrounding vehicles. If the position of the vehicle does not allow for a lane change, the path can be recalculated.

FIG. 5B illustrates a prediction of a vehicle after a time-delay from the position in FIG. 5A. Currently vehicle $V_H$ has reached lane 2, and is sensing the distance between $V_H$ and $V_3$. It is also determining a path for an additional lane change.

FIG. 5C further illustrates vehicle $V_H$ reaching the third lane, after calculating the path. At this point, the vehicle $V_H$, switches off the lane control mode and control of the automobile is returned to the user.

Figure 6:
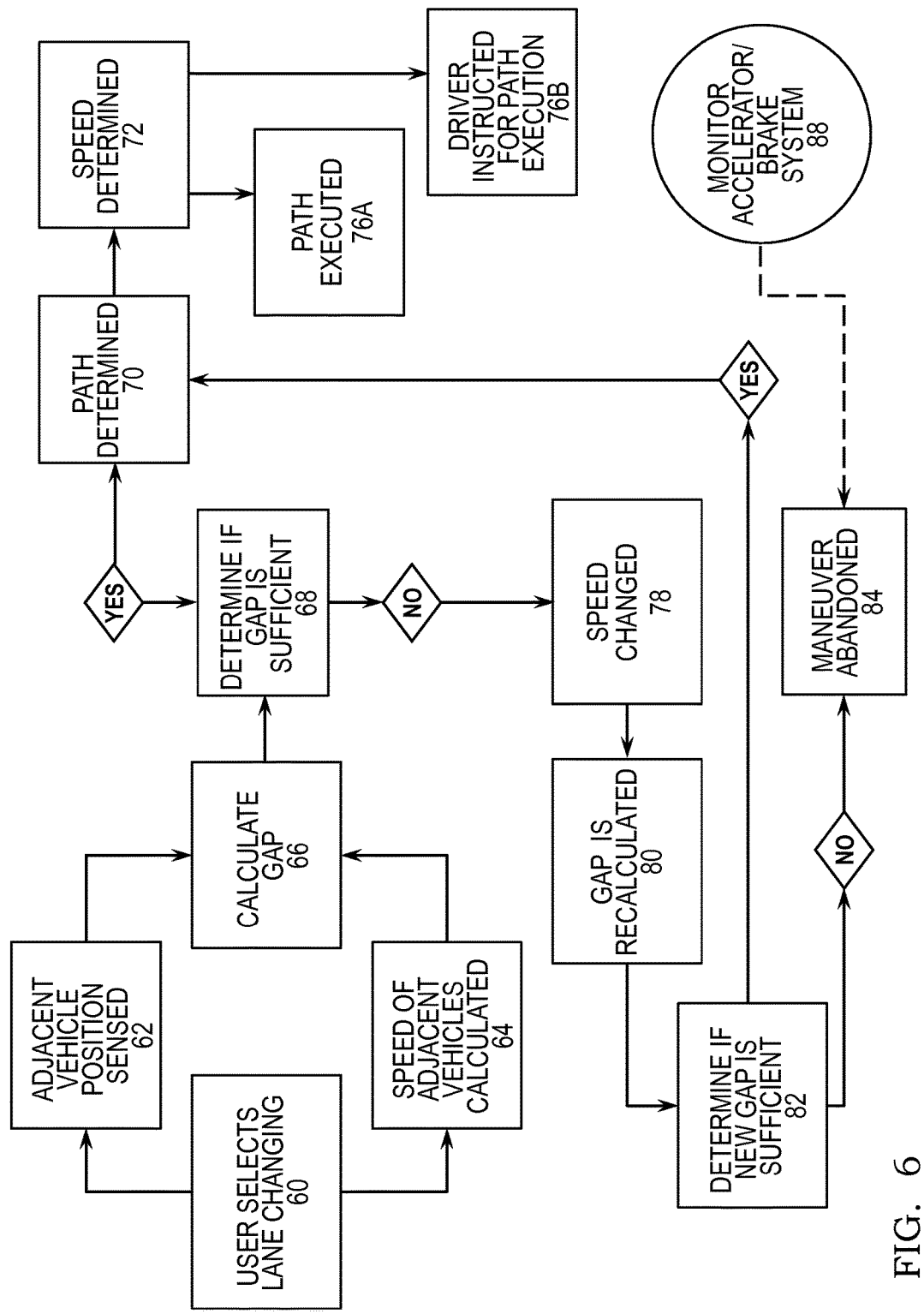
FIG. 6 is a block diagram of an algorithm for lane-changing mode.

Referring to FIG. 6, after the driver selects the lane changing mode, in operation 60 the source vehicle $V_H$ controller turns the turn-signal on. This indicates to other vehicles that the source vehicle is attempting to change lanes.

The vehicle controller performs a gap assessment in operations 62-66. Gap assessment is performed in operation 62 by determining the position of the surrounding vehicles. The speed of the surrounding vehicles is calculated by the controller in operation 64. The gap is assessed based upon the speed and position of the adjacent surrounding vehicles in operation 66. The controller also calculates the speed that will allow the source vehicle to move into the gap. If the size of the gap is determined to be sufficient in operation 68, the vehicle controller generates path data to control the steering and speed control systems.

In operation 70, if the gap is suitable, a path and a speed for the vehicle are calculated. There are a variety of path generation algorithms that are known in the art. The controller 16 may receive information about the current path through either map-tracking software or through information from the visual sensors. These algorithms can be heuristic algorithms used to estimate a path to travel between two points. The Dijkstra algorithm is an example of an algorithm known in the art to generate a path. The Dijkstra algorithm divides the different possible paths into weighted nodes based on distance, and selects the node with the lowest value. The controller 16 may generate a plurality of paths using various other algorithms known in the art. The controller 16 runs a search among the plurality of the paths generated and finds the one with the smallest distance.

The path profile calculated in operation 70 is executed in operation 76. The vehicle controller controls the steering system to execute the path profile. In operation 76, the vehicle controller turns off the turn-signal and also the lane changing mode and returns control to the user.

If a suitable gap is not available at 68, the controller may change the speed of the source vehicle and calculate an alternate path based on the change in the relative position, speed and acceleration of the source vehicle with respect to the surrounding vehicles. For example, the controller may allow for the vehicles in adjacent lanes move ahead of the current vehicle.

In operation 80, a new gap is calculated by returning to operation 32, in FIG. 2, and incrementing a counter. The controller again attempts to generate a path with the newly calculated gap. Referring to FIG. 5, by slowing the speed of vehicle $V_H$ vehicle $V_2$ is allowed to move ahead of the source vehicle $V_H$. Referring to FIG. 6, in operation 82, if the second gap is not deemed suitable, the controller may either repeat the process again, or if a predetermined number is reached by the counter, the system may abandon the attempt to change lanes at 84.

In operation 88, the controller 16 monitors the accelerator/brake systems 20. If the user actuates the accelerator/brake systems 20, control of the vehicle is returned to the user. This process is active throughout the execution of the lane changing or lane keeping maneuver.

Figure 7:
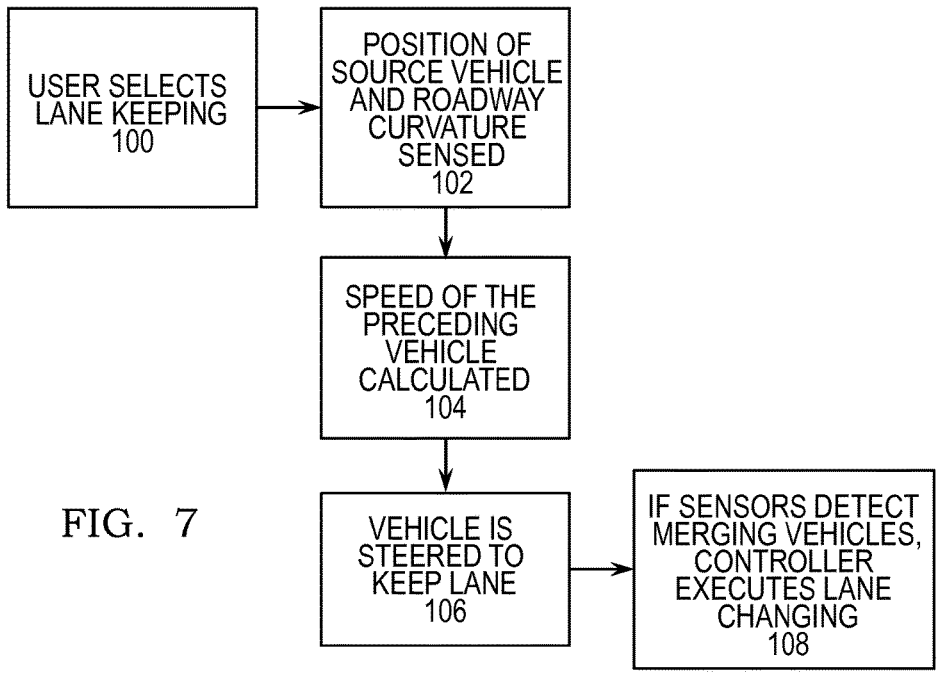
FIG. 7 is a flow chart indicating the lane keeping algorithm.

FIG. 7 is a flow chart indicating the lane keeping algorithm. In operation 100, the user selects lane keeping mode. In operation 102, the position of the source vehicle is sensed with respect to the current lane and the curvature of the road way. The curvature of the roadway is sensed using an accelerometer that senses the yaw of the vehicle. The GPS-equipped map database may provide data relating to the curvature of the roadway in front of the source vehicle allowing for path generation data to be corrected for oncoming roadway curvature. In operation 104, the speed of the preceding vehicle is calculated, using position sensors of the source vehicle to get the speed of the source vehicle. In operation 106, the controller provides path data to the steering system to keep the vehicle in the current lane setting function in conjunction with the speed setting function. The vehicle maintains the lane either by a position sensor that perceives lane markings or by using GPS map data. GPS data can give roadway curvature data to maneuver the vehicle within the current lane. In operation 108, if the source vehicle $V_H$ senses another vehicle merging onto the highway, the controller may provide instructions to the steering system 18 and accelerator/brake systems 20 to execute an automatic lane change, overriding the lane keeping mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An autonomous lane-changing system for a motor vehicle comprising:
   a sensor configured to determine a position of a plurality of surrounding vehicles within a predetermined area and to provide a position signal for each surrounding vehicle; and
   a controller configured to
      receive the position signals, to generate path data for the motor vehicle, and to provide a series of instructions for a steering system, and
      return control of braking, steering, and accelerator systems to a driver in response to receiving at least one of a brake application, a steering input, or an accelerator input.

2. The system of claim 1 further comprising:
   a steering system configured to maneuver the vehicle to follow the path data in response to the series of instructions provided by the controller;

a brake sensor configured to provide a brake applied input signal when the driver applies the brakes;

a manual steering sensor configured to provide a manual-steering applied input signal when the driver turns a steering wheel that causes the vehicle to vary from the series of instructions; and an accelerator pedal sensor configured to provide a manual accelerator input signal when the driver contacts an accelerator.

3. The system of claim 1 wherein the controller is further configured to process the position signals to calculate a gap value between the surrounding vehicles in a target lane.

4. The system of claim 3 wherein the controller is further configured to process the gap value to generate the series of instructions to maneuver the motor vehicle into the target lane.

5. The system of claim 3 further comprising:
a speed control system configured to control the speed of the vehicle,
wherein the series of instructions includes a speed instruction that is provided to the speed control system, and wherein the controller is further configured to process the gap value to determine whether the gap value is less than an adequate clearance value, and, in response to the gap value being less than the adequate clearance value to modify the speed instruction, to change the speed of the motor vehicle.

6. The system of claim 3 wherein the controller is further configured to transmit a signal of the generated path data to a user.

7. The system of claim 6 further comprising a display screen configured to display a visual representation of the generated path data.

8. The system of claim 7 wherein the generated path data includes a series of instructions for the user to follow.

9. The system of claim 7 wherein the display screen is further configured to display a map with the generated path data marked on the map.

10. An autonomous vehicle system comprising:
a sensor configured to provide a position signal indicative of a plurality of surrounding vehicles within a predetermined area of a vehicle; and
a controller configured to
generate a path for the vehicle,
provide instructions for a steering system based on the path, and
return control of the steering system to a driver in response to driver interaction at one of a brake, a steering wheel, or an accelerator.

11. The system of claim 10 wherein the steering system includes the steering wheel, the brake and the accelerator, each configured to receive instructions from the controller based on the generated path.

12. The system of claim 11 further comprising:
a steering system configured to maneuver the vehicle to follow the path in response to the instructions provided by the controller;
a brake sensor configured to provide a brake applied input signal when the driver applies the brakes;
a manual steering sensor configured to provide a manual-steering applied input signal when the driver turns a steering wheel that causes the vehicle to vary from the instructions; and
an accelerator pedal sensor configured to provide a manual accelerator input signal when the driver contacts the accelerator.

13. The system of claim 10 wherein the controller is further configured to process the position signal to calculate a gap value between the surrounding vehicles in a target lane.

14. The system of claim 13 wherein the controller is further configured to process the gap value to generate the instructions to maneuver the vehicle into the target lane.

15. The system of claim 13 further comprising:
a speed control system configured to control the speed of the vehicle,
wherein the instructions include a speed instruction that is provided to the speed control system, and wherein the controller is further configured to process the gap value to determine whether the gap value is less than an adequate clearance value, and, in response to the gap value being less than the adequate clearance value to modify the speed instruction, to change the speed of the vehicle.

16. The system of claim 10 further comprising a display screen configured to display a visual representation of the generated path.

17. The system of claim 16 wherein the generated path includes a series of user instructions.

18. The system of claim 16 wherein the display screen is further configured to display a map with the generated path marked on the map.

* * * * *